(12) United States Patent
Hayashi

(10) Patent No.: US 10,866,641 B2
(45) Date of Patent: Dec. 15, 2020

(54) VIBRATION SYSTEM

(71) Applicants: Nidec Corporation, Kyoto (JP); Nidec Seimitsu Corporation, Ueda (JP)

(72) Inventor: Tetsufumi Hayashi, Ueda (JP)

(73) Assignees: NIDEC CORPORATION, Kyoto (JP); NIDEC SEIMITSU CORPORATION, Nagano (JP)

( * ) Notice: Subject to any disclaimer, the term of this patent is extended or adjusted under 35 U.S.C. 154(b) by 101 days.

(21) Appl. No.: 16/133,734

(22) Filed: Sep. 18, 2018

(65) Prior Publication Data

US 2019/0094974 A1    Mar. 28, 2019

(30) Foreign Application Priority Data

Sep. 28, 2017  (JP) ................. 2017-189077

(51) Int. Cl.
| | |
|---|---|
| G06F 3/01 | (2006.01) |
| G06F 3/0354 | (2013.01) |
| G06F 3/044 | (2006.01) |
| G06F 3/041 | (2006.01) |
| G06F 3/0488 | (2013.01) |

(52) U.S. Cl.
CPC .......... *G06F 3/016* (2013.01); *G06F 3/03545* (2013.01); *G06F 3/03547* (2013.01); *G06F 3/044* (2013.01); *G06F 3/0416* (2013.01); *G06F 3/04883* (2013.01)

(58) Field of Classification Search
CPC .. G06F 3/016; G06F 3/03545; G06F 3/03547; G06F 3/0416; G06F 3/044; G06F 3/04883

See application file for complete search history.

(56) References Cited

U.S. PATENT DOCUMENTS

| | | | | |
|---|---|---|---|---|
| 6,014,028 | A * | 1/2000 | Ohashi ................... | G01R 29/24 324/457 |
| 8,723,820 | B1 * | 5/2014 | Han .................... | G06F 3/03545 345/173 |
| 2009/0079703 | A1 * | 3/2009 | Kyung .................... | G06F 3/016 345/173 |
| 2010/0090815 | A1 | 4/2010 | Yamaya | |
| 2013/0229384 | A1 * | 9/2013 | Adachi ................... | G06F 3/016 345/174 |

(Continued)

FOREIGN PATENT DOCUMENTS

| | | |
|---|---|---|
| JP | 7-266779 A | 10/1995 |
| JP | 10-91317 A | 4/1998 |

(Continued)

*Primary Examiner* — Amare Mengistu
*Assistant Examiner* — Jennifer L Zubajlo
(74) *Attorney, Agent, or Firm* — Keating & Bennett

(57) ABSTRACT

A vibration system includes a linear vibration motor, and a controller that controls a drive current waveform of the vibration motor. The drive current waveform includes consecutively arranged large unit waves having the same waveforms side by side on a time axis. Each large unit wave includes a first region having a waveform with a smaller amplitude in one period, which is a width of the large unit wave on the time axis, and a second region having a waveform with a larger amplitude than the amplitude in the first region. The first region and the second region alternatively appear on the time axis.

14 Claims, 14 Drawing Sheets

(56) References Cited

U.S. PATENT DOCUMENTS

| | | | | |
|---|---|---|---|---|
| 2013/0285910 A1* | 10/2013 | Adachi | .................. | G06F 3/016 |
| | | | | 345/159 |
| 2015/0241970 A1* | 8/2015 | Park | ....................... | G06F 3/016 |
| | | | | 345/173 |
| 2015/0277596 A1* | 10/2015 | Hoffman | ................. | G06F 3/016 |
| | | | | 345/179 |
| 2016/0139671 A1* | 5/2016 | Jun | ......................... | G06F 3/016 |
| | | | | 715/702 |
| 2016/0155305 A1* | 6/2016 | Barsilai | .................. | G06F 3/016 |
| | | | | 340/407.1 |
| 2017/0083096 A1* | 3/2017 | Rihn | ..................... | G06F 3/0416 |
| 2017/0364167 A1* | 12/2017 | Ribeiro | ................ | G06F 3/0416 |
| 2019/0213851 A1* | 7/2019 | Rihn | ....................... | G06F 3/016 |

FOREIGN PATENT DOCUMENTS

| | | |
|---|---|---|
| JP | 2003-346171 A | 12/2003 |
| JP | 2004-284341 A | 10/2004 |

* cited by examiner

| PATTERN | TACTILE SENSE IMAGE INTENDED BY INVENTOR | Yes (SENSED) | No (NOT SENSED) | RECOGNITION RATE |
|---|---|---|---|---|
| PATTERN1 | SENSE LIKE WRITING ONTO SMOOTH PAPER | FOUR PERSONS | TWO PERSONS | 67% |
| PATTERN2 | SENSE LIKE WRITING ONTO ROUGH PAPER | FOUR PERSONS | TWO PERSONS | 67% |
| PATTERN3 | SENSE LIKE ERASING WITH ERASER | FOUR PERSONS | TWO PERSONS | 67% |
| PATTERN4 | SENSE LIKE WRITING WITH PENCIL | FIVE PERSONS | ONE PERSON | 83% |
| PATTERN5 | SENSE LIKE TURNING JOG DIAL | SIX PERSONS | NO PERSON | 100% |

Fig.10

VIBRATION SYSTEM

CROSS REFERENCE TO RELATED APPLICATIONS

This application claims the benefit of priority to Japanese Patent Application No. 2017-189077 filed on Sep. 28, 2017. The entire contents of this application are hereby incorporated herein by reference.

BACKGROUND OF THE INVENTION

1. Field of the Invention

The present invention relates to a vibration system.

2. Description of the Related Art

In the related art, a handwriting electronic input system which electronically performs writing input by handwriting is developed and an example thereof is disclosed in International Publication No. 2008/078523.

The handwriting electronic input system in International Publication No. 2008/078523 includes an information writing input unit, an information writing input detection unit, and a writing sense presentation unit. The information writing input unit is a pen type input unit used as a writing instrument for the information writing input handwritten by an operator. The information writing input detection unit is used as a writing target object at the time of an information writing input performed by the information writing input unit and is a detection unit such as a touch panel that detects the information writing input.

The writing sense presenting unit generates a vibration corresponding to a writing sense according to an operation of the information writing input unit at the time of the information writing input performed by the operator. Here, the handwriting electronic input system includes a storage unit that holds a vibration waveform generated by writing on a writing target object using the writing instrument. The writing sense presentation unit generates a vibration reproducing the vibration generated by the writing instrument and the writing target object, according to the vibration waveform held in the storage unit.

International Publication No. 2008/078523 discloses that it is possible to obtain the same sense as actually performing a writing input handwritten by using the writing instrument, when the handwriting input is electronically performed. However, International Publication No. 2008/078523 discloses that it is possible to use a vibration generation unit configured by various actuators for the writing sense presentation unit, but does not disclose a drive current waveform to drive the vibration generation unit. That is, International Publication No. 2008/078523 does not disclose a specific unit that obtains the same sense as actually performing the handwriting input using the writing instrument.

SUMMARY OF THE INVENTION

Accordingly, exemplary embodiments of the present invention provide vibration systems that obtains a sense closer to an actual operation.

A vibration system according to an exemplary embodiment the present invention includes a linear vibration motor, and a controller that controls a drive current waveform of the vibration motor. The drive current waveform includes a first region having a waveform with a small amplitude and a second region having a waveform with a larger amplitude than the amplitude in the first region. The first region and the second region alternatively appear on the time axis.

According to the exemplary preferred embodiments of vibration systems of the present invention, it is possible to obtain a sense closer to an actual operation.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 10 is a table illustrating test results of operation sense.

DETAILED DESCRIPTION OF THE PREFERRED EMBODIMENTS

Exemplary embodiments of the present invention will be hereinafter described with reference to the drawings.

Figure 1:
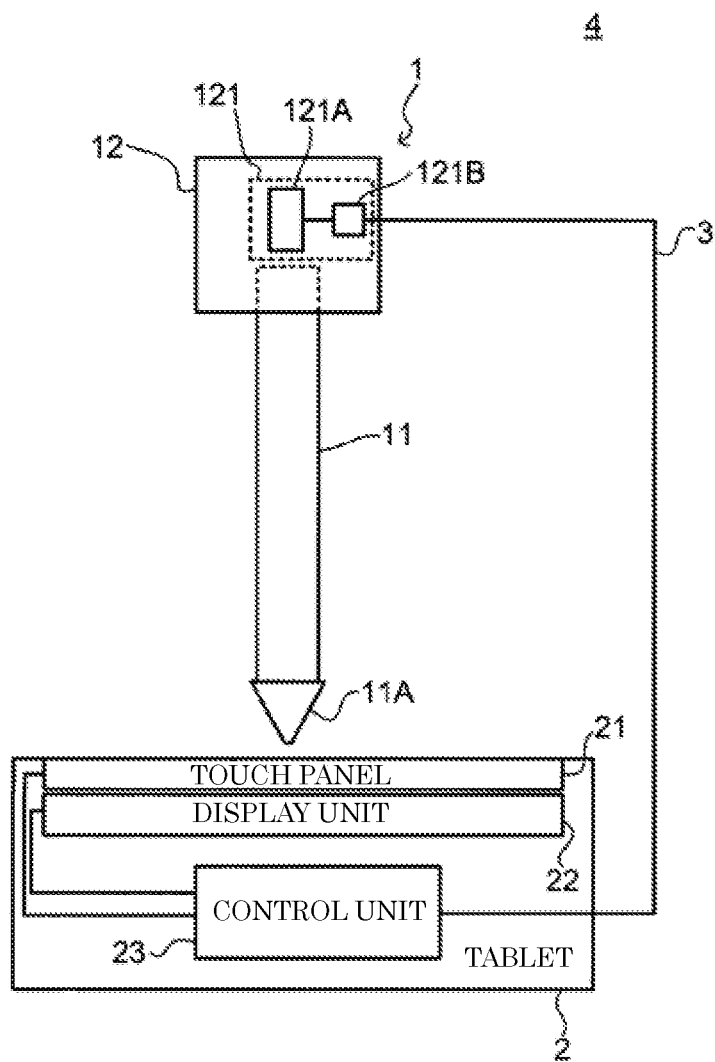
FIG. 1 is a block diagram illustrating a schematic configuration of a handwriting input system according to a first exemplary embodiment of the present invention.

FIG. 1 is a block diagram illustrating a schematic configuration of a handwriting input system according to a first embodiment of the present invention. A handwriting input system 4 illustrated in FIG. 1 includes a touch pen 1 and a tablet 2. The touch pen 1 and the tablet 2 are connected to each other by a wire 3. The handwriting input system 4 electronically performs handwriting by performing a writing operation on the tablet 2 using the touch pen 1.

The touch pen 1 includes a pen unit 11 and a cap unit 12. The pen unit 11 is a pen-shaped unit extending in one direction and includes a pen tip portion 11A which comes into contact with the tablet 2. The cap unit 12 can be attached to and detached from the pen unit 11 and can be attached to an end portion on a side opposite to the pen tip portion 11A of the pen unit 11 in one direction.

The cap unit 12 includes a vibration system 121. The vibration system 121 includes a vibration motor 121A and a controller 121B.

The vibration motor 121A is a so-called linear vibration motor capable of linearly vibrating a vibrator. The vibration motor 121A includes the vibrator, a stator, and an elastic member (all the elements are not illustrated). The stator includes, for example, a casing and a coil. The vibrator includes, for example, a weight and a magnet. The vibrator is supported to the stator by the elastic member so as to be vibratable. For example, a leaf spring or a wound spring is used as the elastic member. A magnetic flux is generated in the coil as an electric current flows through the coil, and the vibrator linearly vibrates according to the interaction between the generated magnetic flux and the magnetic flux generated by the magnet. The vibration motor 121A may adopt any of a lateral linear type and a vertical linear type.

The vibration motor 121A vibrates the vibrator to vibrate the cap unit 12 and the pen unit 11, which are vibration targets in one direction in which the pen unit 11 extends. The controller 121B controls the drive current supplied to the vibration motor 121A. The controller 121B includes, for example, a microcomputer and a driver (both are not illustrated). In this case, the driver supplies the drive current to the vibration motor 121A under the control of the microcomputer. The controller 121B can control various drive current waveforms of the drive current supplied to the vibration motor 121A, which will be described below.

The tablet 2 includes a touch panel 21, a display unit 22, and a controller 23. The touch panel 21 is a device that detects a position touched by an operation tool and is disposed so as to be contactable by a pen tip portion 11A of the pen unit 11. For example, a capacitance type touch panel can be adopted as the touch panel 21.

The display unit 22 is disposed to face a surface opposite to a surface touched by the pen tip portion 11A of the touch panel 21. An operator can visually recognize an image displayed on the display unit 22 via the touch panel 21. The display unit 22 is configured with, for example, a liquid crystal display unit. In this case, the display unit 22 includes a backlight and a liquid crystal panel. The tablet 2 may be configured without the display unit 22.

The controller 23 controls an image display performed by the display unit 22. Particularly, the controller 23 controls an image displayed on the display unit 22, based on a position detection signal received from the touch panel 21. In addition, the controller 23 is connected to the controller 121B by the wire 3. The controller 23 transmits a control signal to the controller 121B via the wire 3, and the controller 121B controls a drive current waveform of the vibration motor 121A, based on the received control signal.

Next, the drive current waveform of the vibration motor 121A for realizing various operational senses in the handwriting input system 4 having the above configuration will be described.

First, an operation sense according to the first example realized by the handwriting input system 4 will be described. The operation sense according to the first example is a tactile sense of writing a letter or the like on smooth paper (paper with less friction) in a handwriting manner.

If an operator grips the pen unit 11 and performs an operation of writing a letter or the like while bringing the pen tip portion 11A into contact with a surface of the touch panel 21, the touch panel 21 detects a contact position with the pen tip portion 11A. The controller 23 causes an image corresponding to handwriting to be displayed on the display unit 22, based on the detection result received from the touch panel 21. Thereby, a letter or the like corresponding to the writing operation performed by the pen unit 11 is displayed on the display unit 22. At this time, the controller 23 transmits a control signal to the controller 121B via the wire 3, thereby causing the controller 121B to control the drive current waveform.

Figure 2A:
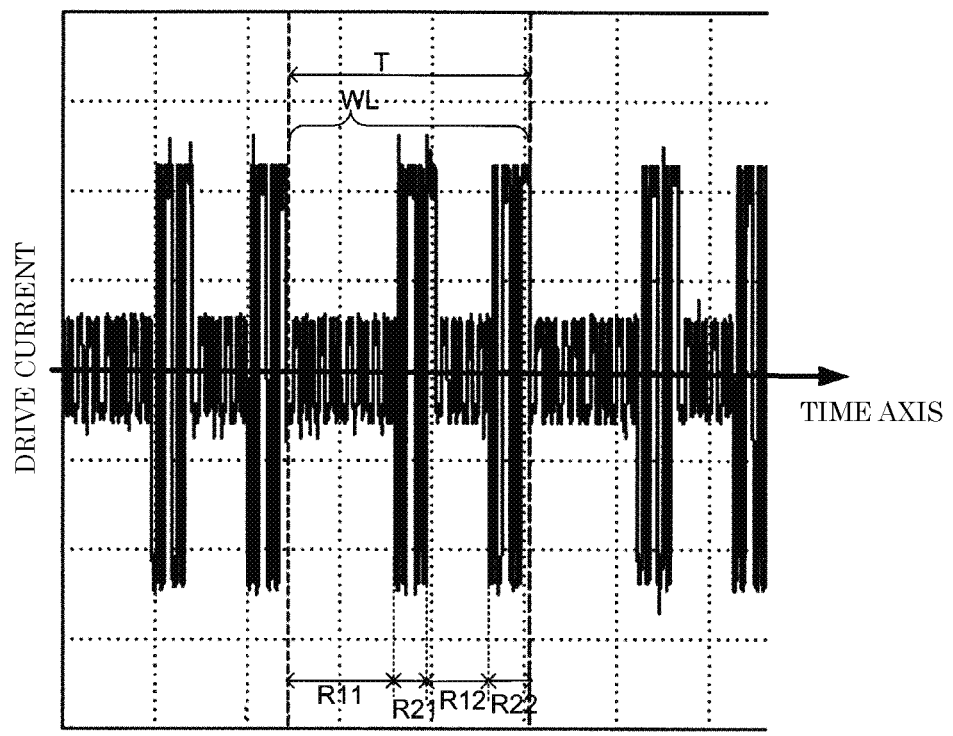
FIG. 2A is a view illustrating a drive current waveform according to a first example.

An example of the drive current waveform in this case is illustrated in FIG. 2A. In FIG. 2A, a horizontal axis denotes a time axis and a vertical axis denotes a drive current value. A positive (polarity) and a negative (polarity) of the drive current value are different from each other in each of an upper region and a lower region by using the time axis as a boundary. That is, the drive current waveform illustrated in FIG. 2A is an alternating waveform that varies over different polarities of the drive current value.

The drive current waveform illustrated in FIG. 2A includes first regions R11 and R12 and second regions R12 and R22 in one period T. The drive current waveform is configured by consecutively arranging large unit waves WL having the same waveforms side by side on the time axis. The large unit wave WL includes at least both a first region and a second region. The one period T is a width of the large unit wave WL on the time axis. The same applies to drive current waveforms according to the other examples which will be described below in the same manner as the large unit wave WL. The first regions R11 and R12 which are time axis regions have waveforms of a small amplitude which is a same predetermined amplitude. The second regions R21 and R22 which are the time axis region have waveforms of the same amplitude as each other and larger amplitudes than amplitudes of the waveforms of the small amplitudes.

The first region R12 has a smaller time axis width than the first region R11. The second regions R21 and R22 have the same time axis width. The time axis widths of the second regions R21 and R22 are smaller than any time axis width of the first regions R11 and R12.

In one period T, the first region R11, the second region R21, the first region R12, and the second region R22 sequentially appear on the time axis. The waveform of one period T appears repeatedly on the time axis. That is, the first regions R11 and R12 and the second regions R21 and R22 alternatively appear on the time axis.

After the first region R11, the second region R21 having a smaller time axis width than the first region R11 appears, and after the first region R12, a second region R22 having a smaller time axis width than the first region R12 appears. Thereby, an operator can feel the vibration based on the drive current waveform in the second regions R21 and R22 as an accent.

Figure 2B:
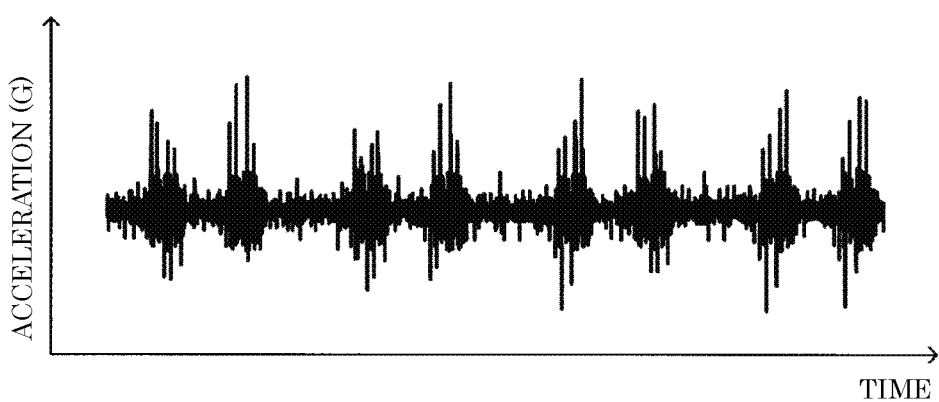
FIG. 2B is a view illustrating a vibration waveform corresponding to the drive current waveform according to the first example.

As described above, the first regions R11 and R12 have a waveform of a single amplitude, and in one period T of the drive current waveform, the first region R12 and the second region R22 having smaller time axis widths than the first region R11, the second region R21, and the first region R11 sequentially appear on the time axis. An example of a vibration waveform of the vibration motor 121A based on the drive current waveform is illustrated in FIG. 2B.

As the cap unit 12 and the pen unit 11 vibrate according to the vibration of the vibration motor 121A, an operator who performs a writing operation using the pen unit 11 can obtain a sense close to handwriting of writing a letter or the like on the paper that is actually smooth via a tactile sense.

Figure 3:
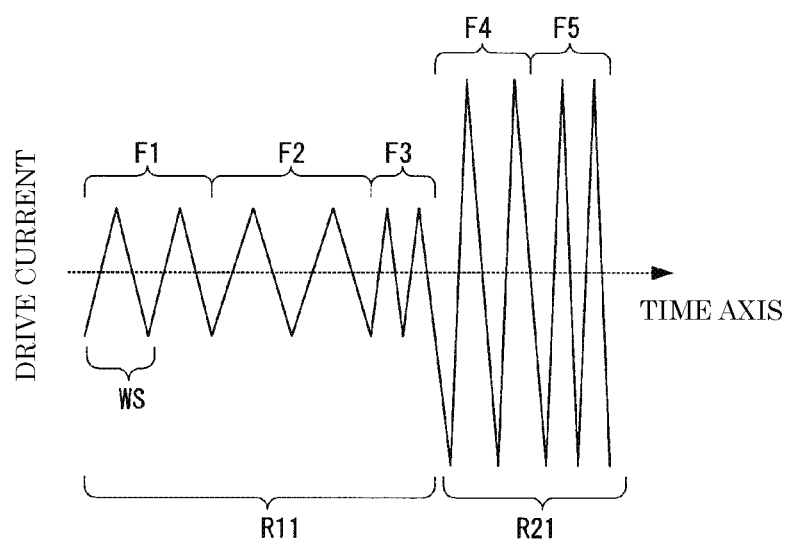
FIG. 3 is a view schematically illustrating waveforms included in the respective regions in the drive current waveform according to the first example, for the sake of convenience.

In each of the first region and the second region, a plurality of small unit waves are consecutively arranged on the time axis. The small unit wave is a waveform in which one phase advances from a certain point on the time axis in the drive current waveform. Accordingly, a frequency of the small unit wave is different from a frequency corresponding to one period T. The same applies to the drive current waveform according to another example which will be described below in the same manner as the small unit wave. Here, the frequency of the small unit wave in the drive current waveform illustrated in FIG. 2A will be described. FIG. 3 is a diagram schematically illustrating small unit waves WS included in the respective regions in the drive current waveform illustrated in FIG. 2A for the sake of convenient description. FIG. 3 schematically illustrates waveforms included in the first region R11 and the second region R21.

As illustrated in FIG. 3, the respective waveforms of frequencies F1, F2, and F3 in the first region R11 sequentially appear on the time axis, and the respective waveforms of frequencies F4 and F5 in the second region R21 sequentially appear on the time axis. In the first region R11, adjacent frequencies F1 and F2 are different from each other, and adjacent frequencies F2 and F3 are also different from each other. In the second region R21, adjacent frequencies F4 and F5 are different from each other. While not illustrated in FIG. 3, the first region R12 and the second region R22 also have the same frequency configuration.

That is, at least one of the first regions R11 and R12 and the second regions R21 and R22 have waveforms which are different from each other in frequency and are adjacent on the time axis. Thereby, it is possible to obtain a natural change in tactile sense in actual handwriting.

The frequency configuration of the first region and the second region is not limited to the configuration illustrated in FIG. 3, and various configurations can be adopted. For example, types of the frequencies in the first region are not limited to the three types illustrated in FIG. 3, and types of the frequencies in the second region are not limited to the two types illustrated in FIG. 3 and may be a plurality of other types. In addition, the frequency may be single in the second region.

In addition, in each region, if the adjacent frequencies are different, the same frequency may appear over time. For example, in the example of FIG. 3, the frequency F1 appears again after the frequency F3, and the like, in the first region R11.

In addition, when a shift is made between the first region and the second region, the shift may be made at different frequencies or may be made at the same frequency. In the example of FIG. 3, when a shift is made from the first region R11 to the second region R21, the shift is made at different frequencies F3 and F4, but at this time, the shift may be made at the same frequency F3.

In addition, at least one of the number of frequency types and a frequency value may be changed between the first region R11 and the first region R12.

Next, an operation sense according to a second example realized by the handwriting input system 4 will be described. The operation sense according to the second example is a tactile sense of writing a letter or the like on rough paper (large friction paper) by using handwriting.

Figure 4A:
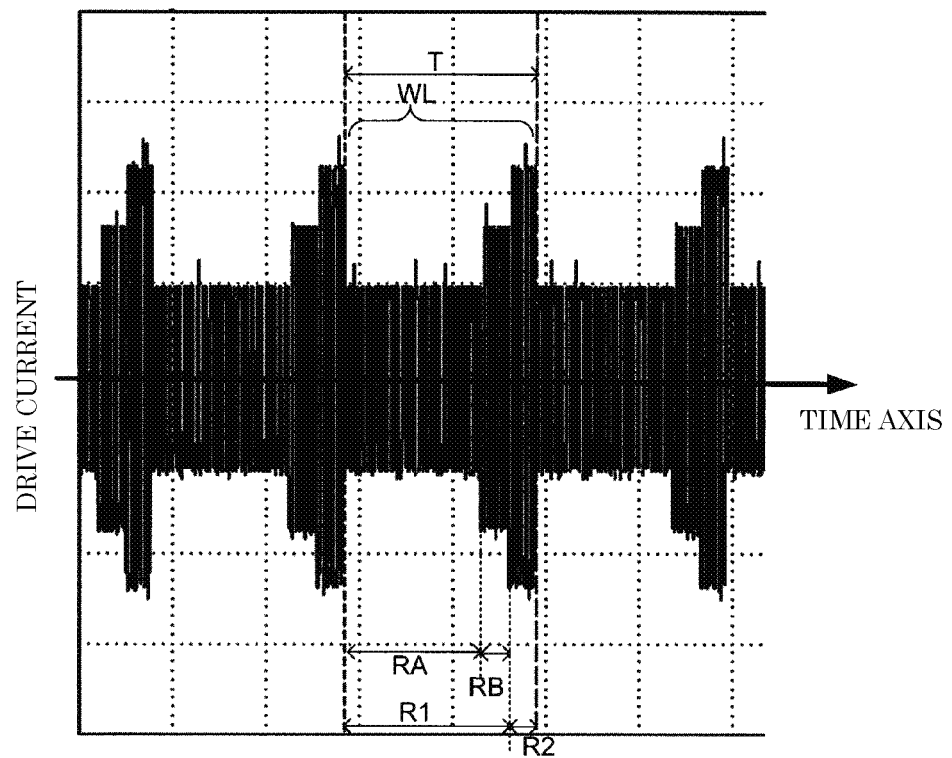
FIG. 4A is a view illustrating a drive current waveform according to a second example.

In the present embodiment, in the same manner as the first example described above, when the controller 23 causes a letter or the like to be displayed on the display unit 22 in response to a writing operation performed by bringing the pen unit into contact with the touch panel 21, the controller 23 transmits a control signal to the controller 121B, and the controller 121B controls a drive current waveform of the vibration motor 121A. The drive current waveform at this time is illustrated in FIG. 4A.

The drive current waveform illustrated in FIG. 4A varies above and below the time axis in the same manner as in FIG. 2A. The drive current waveform illustrated in FIG. 4A includes a first region R1 and a second region R2 in one period T. The first region R1 includes regions RA and RB. An amplitude of a waveform included in the region RB is larger than an amplitude of a waveform included in the region RA. That is, the first region R1 includes a plurality of regions RA and RB having different waveform amplitudes. An amplitude of a waveform included in the second region R2 is larger than an amplitude of any of the waveforms of the regions RA and RB.

In the first region R1, the region RB appears after the region RA. In one period T, the second region appears after the first region R1. Waveforms of the one period T appear repeatedly on the time axis. That is, the first region R1 and the second region R2 having a larger amplitude than the first region R1 alternatively appear on the time axis.

In the one period T, the second region R2 having a time axis width smaller than a time axis width of the first region R1 appears after the first region R1. Thereby, an operator can feel the vibration based on the drive current waveform in the second region R2 as an accent.

Figure 4B:
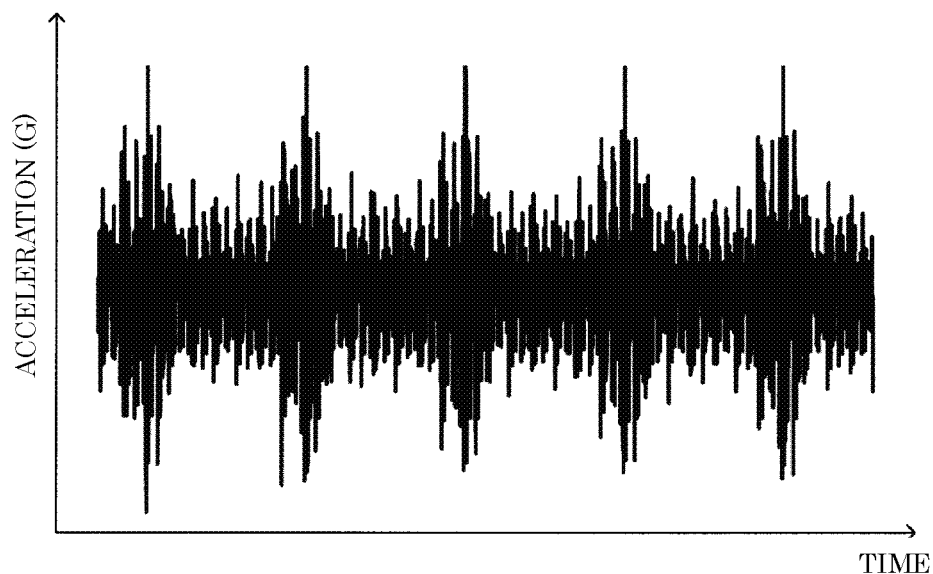
FIG. 4B is a view illustrating a vibration waveform corresponding to the drive current waveform according to the second example.

FIG. 4B illustrates an example of the vibration waveform of the vibration motor 121A based on the drive current waveform. As the cap unit 12 and the pen unit 11 vibrate according to the vibration of the vibration motor 121A, an operator who performs a writing operation using the pen unit 11 can obtain a sense close to handwriting of writing a letter or the like on actually smooth paper via a tactile sense.

Figure 5:
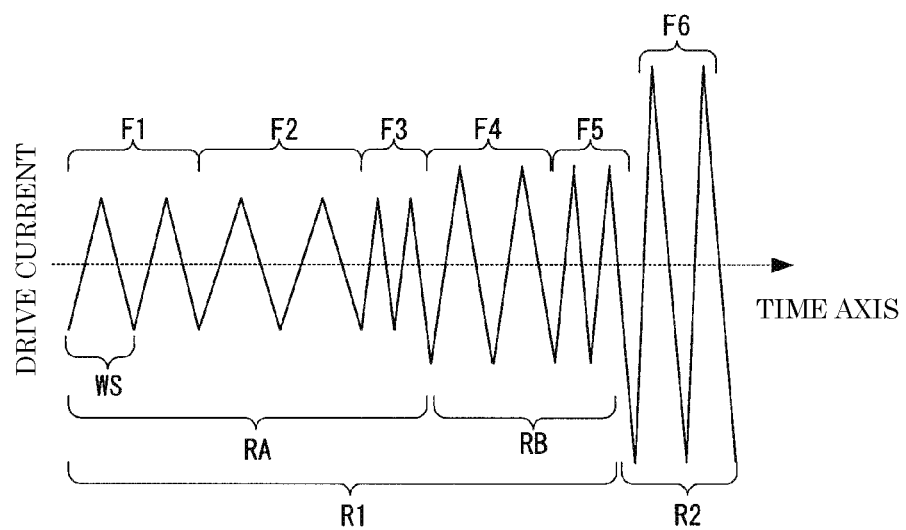
FIG. 5 is a diagram schematically illustrating waveforms included in the respective regions in the drive current waveform according to the second example, for the sake of convenience.

Here, the frequency of the waveform in the drive current waveform illustrated in FIG. 4A will be described. FIG. 5 is a diagram schematically illustrating small unit waves WS included in the respective regions of the drive current waveform illustrated in FIG. 4A for the sake of convenient description.

The respective waveforms of the frequencies F1, F2, and F3 sequentially appear on the time axis in the region RA, and the respective waveforms of the frequencies F4 and F5 sequentially appear on the time axis in the region RB. In the region RA, adjacent frequencies F1 and F2 are different from each other, and adjacent frequencies F2 and F3 are also different from each other. In the region RB, adjacent frequencies F4 and F5 are different from each other. In addition, a waveform of a single frequency F6 is included in the second region R2. Another frequency adjacent to the frequency F6 may be included in the second region R2.

That is, at least one of the first region R1 and the second region R2 has waveforms that are different in frequency and are adjacent to each other on the time axis. Thereby, it is possible to obtain a natural change in tactile sense in actual handwriting.

Next, an operation sense according to a third example realized by the handwriting input system 4 will be described. The operation sense according to the third example is a sense like scraping a letter or the like using a nail.

Figure 6A:
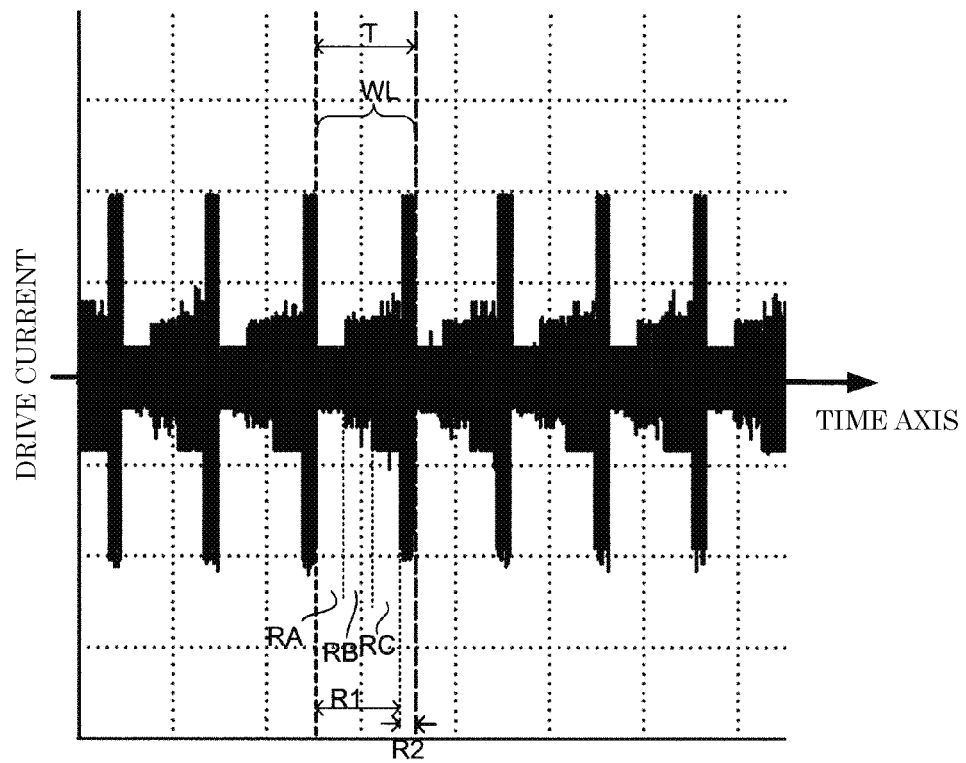
FIG. 6A is a view illustrating a drive current waveform according to a third example.

In the present embodiment, the operator brings the touch pen 11 into contact with the touch panel 21 so as to delete a letter or the like displayed on the display unit 22. Thereby, the controller 23 controls the display unit 22 so as to delete an image such as a letter or the like corresponding to the detected position based on the detection result received from the touch panel 21. At this time, the controller 23 transmits a control signal to the controller 121B, and the controller 121B controls the drive current waveform of the vibration motor 121A. The drive current waveform at this time is illustrated in FIG. 6A.

The drive current waveform illustrated in FIG. 6A varies above and below the time axis in the same manner as in FIG. 2A. The drive current waveform illustrated in FIG. 6A includes the first region R1 and the second region R2 in one period T. The first region R1 includes the region RA, the region RB, and a region RC. An amplitude of a waveform included in the region RB is larger than an amplitude of a waveform included in the region RA. An amplitude of a waveform included in the region RC is larger than the amplitude of the waveform included in the region RB. That is, the first region R1 includes a plurality of regions RA, RB, and RC having different waveform amplitudes. The amplitude of the waveform included in the second region R2 is larger than the amplitude of any of the waveforms included in the regions RA, RB, and RC.

In the first region R1, the region RB appears after the region RA, and the region RC appears after the region RB. In one period T, the second region appears after the first region R1. The waveform in the one period T appears repeatedly on the time axis. That is, the first region R1 and the second region R2 having a larger amplitude than the first region R1 alternatively appear on the time axis.

In one period T, the second region R2 having a time axis width smaller than a time axis width of the first region R1 appears after the first region R1. Thereby, an operator can feel the vibration based on the drive current waveform in the second region R2 as an accent.

Figure 6B:
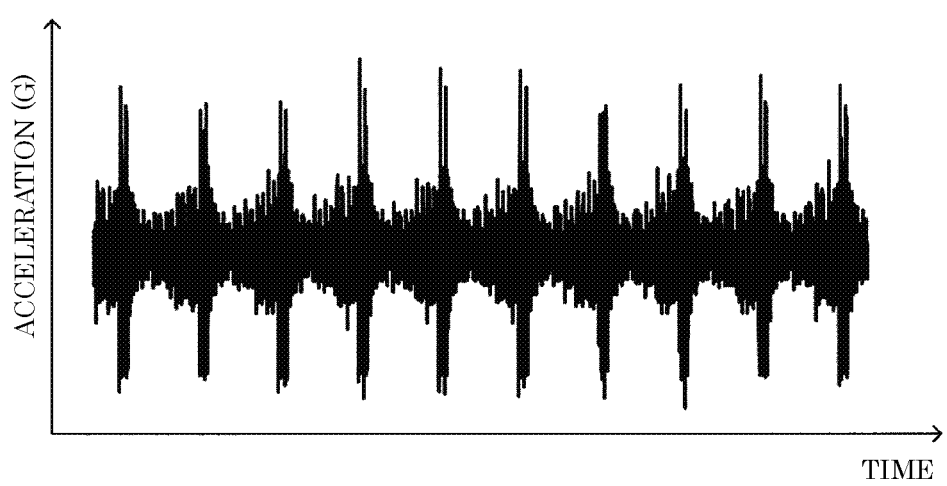
FIG. 6B is a view illustrating a vibration waveform corresponding to the drive current waveform according to the third example.

FIG. 6B illustrates an example of the vibration waveform of the vibration motor 121A based on the drive current waveform. As the cap unit 12 and the pen unit 11 vibrate according to the vibration of the vibration motor 121A as described above, an operator who performs an operation of scraping a letter or the like using the pen unit 11 can obtain a sense close to an operation of actually scraping the letter or the like using a nail.

In addition, in the present example, waveforms of different frequencies are adjacent on the time axis in each of the regions RA, RB, and RC and the second region R2, in the same manner as in the first example and the second example. For example, a waveform of a single frequency may be included in the second region R2. Thereby, it is possible to obtain a natural change in tactile sense in the operation of actually erasing a letter or the like.

Next, an operation sense according to a fourth example realized by the handwriting input system 4 will be described. The operation sense according to the fourth embodiment is a sense like erasing a letter or the like with an eraser.

Figure 7A:
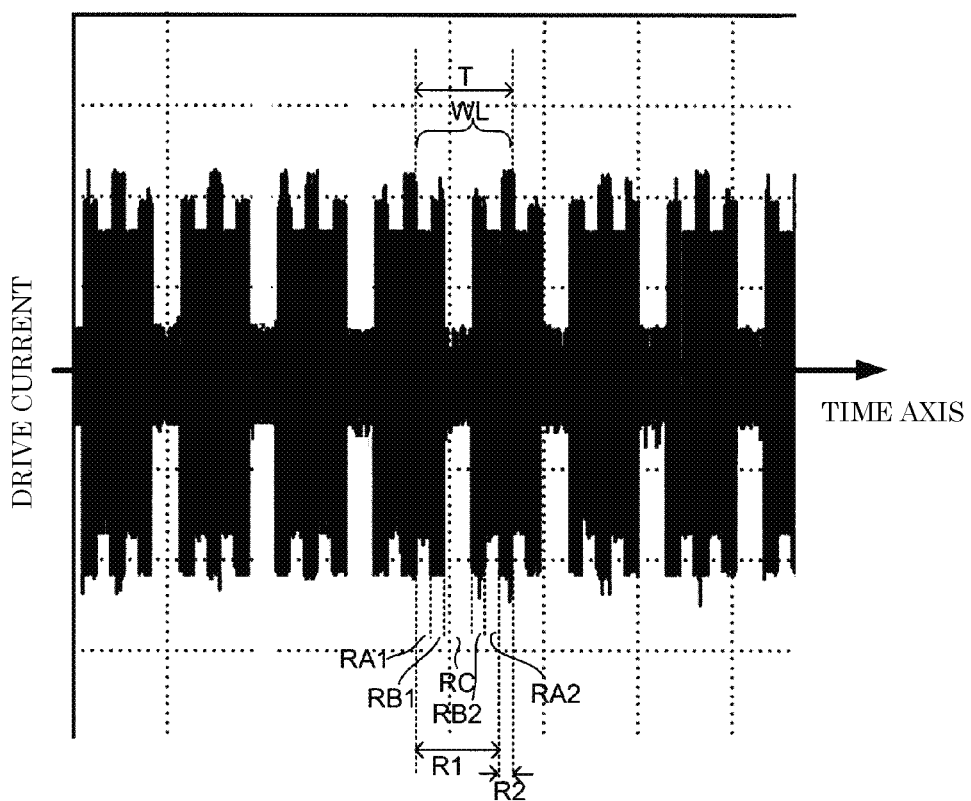
FIG. 7A is a view illustrating a drive current waveform according to a fourth example.

In the present embodiment, an operator brings the touch pen 11 into contact with the touch panel 21 so as to delete a letter or the like displayed on the display unit 22. Thereby, the controller 23 controls the display unit 22 so as to delete an image such as a letter or the like corresponding to the detected position, based on the detection result received from the touch panel 21. At this time, the controller 23 transmits a control signal to the controller 121B, and the controller 121B controls the drive current waveform of the vibration motor 121A. The drive current waveform at this time is illustrated in FIG. 7A.

The drive current waveform illustrated in FIG. 7A varies above and below the time axis in the same manner as in FIG. 2A. The drive current waveform illustrated in FIG. 7A includes the first region R1 and the second region R2 in one period T. The first region R1 includes regions RA1, RA2, RB1, RB2, and RC.

The regions RA1 and RA2 have waveforms of a same predetermined amplitude. The regions RB1 and RB2 have waveforms of a same predetermined amplitude. The amplitudes of the waveforms of the regions RB1 and RB2 are larger than the amplitudes of the waveforms of the regions RA1 and RA2. An amplitude of a waveform of the region RC is smaller than the amplitudes of the waveforms of the region RA1 and RA2. That is, the first region R1 includes a plurality of regions RA1, RA2, RB1, RB2, and RC having different waveform amplitudes. An amplitude of a waveform included in the second region R2 is larger than the amplitude of any of the waveforms of the regions RA1, RA2, RB1, RB2, and RC.

In the first region R1, the regions RA1, RB1, RC, RB2, and RA2 sequentially appear. The second region R2 appears after the first region R1. The waveforms in one period T repeatedly appear on the time axis. That is, the first region R1 and the second region R2 having a larger amplitude than the first region R1 alternatively appear on the time axis.

In the one period T, the second region R2 having a time axis width smaller than a time axis width of the first region R1 appears after the first region R1. Thereby, an operator can feel the vibration based on the drive current waveform in the second region R2 as an accent.

Figure 7B:
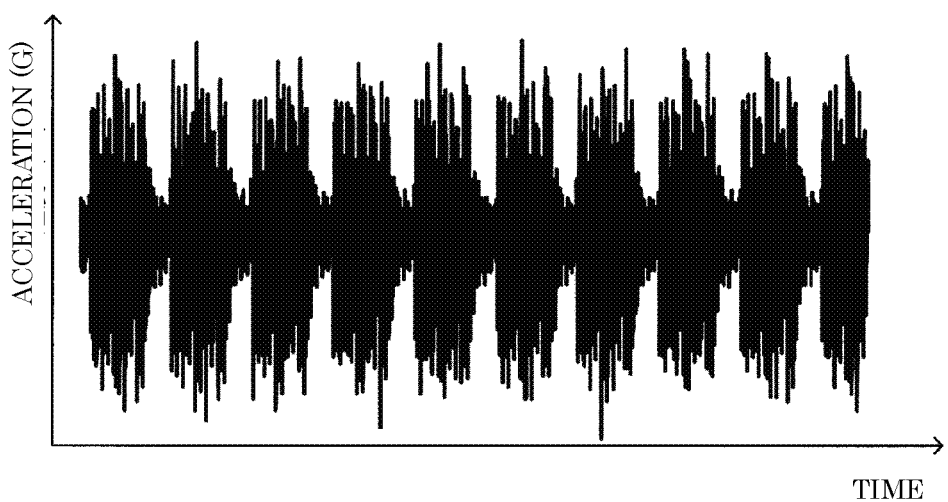
FIG. 7B is a view illustrating a vibration waveform corresponding to the drive current waveform according to the fourth example.

An example of the vibration waveform of the vibration motor 121A based on the drive current waveform is illustrated in FIG. 7B. The cap unit 12 and the pen unit 11 vibrate according to the vibration of the vibration motor 121A, and thereby, an operator who performs an operation of scraping a letter or the like using the pen unit 11 can obtain a sense close to an operation of actually erasing the letter or the like with an eraser.

In addition, in the present embodiment, waveforms of different frequencies are also adjacent to each other on the time axis in the regions RA1, RB1, RC, RB2, RA2, and each of the second region R2, in the same manner as the above-described examples. For example, a waveform of a single frequency may be included in the second region R2. Thereby, it is possible to obtain a natural change in tactile sense in the operation of actual erasing a letter or the like with an eraser.

Next, an operation sense according to a fifth example realized by the handwriting input system 4 will be described. The operation sense according to the fifth embodiment is a sense like weakly catching as if an operator writes a letter or the like with a pencil.

Figure 8A:
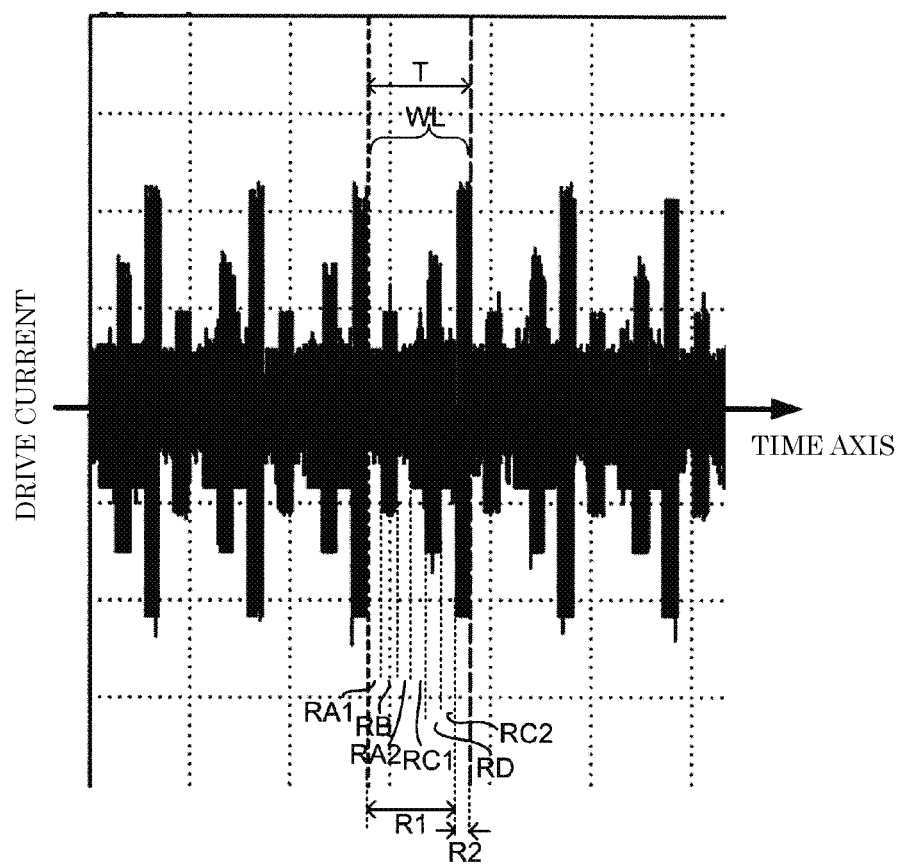
FIG. 8A is a view illustrating a drive current waveform according to a fifth example.

In the present example, when the controller 23 causes a letter or the like to be displayed on the display unit 22 in response to a writing operation of bringing the pen unit 11 into contact with the touch panel 21, the controller 23 transmits a control signal to the controller 121B, and the controller 121B controls the drive current waveform of the vibration motor 121A, in the same manner as in the first embodiment described above. The drive current waveform at this time is illustrated in FIG. 8A.

The drive current waveform illustrated in FIG. 8A varies above and below the time axis in the same manner as in FIG. 2A. The drive current waveform illustrated in FIG. 8A includes the first region R1 and the second region R2 in one period T. The first region R1 includes regions RA1, RA2, RB, RC1, RC2, and RD.

The regions RA1 and RA2 have waveforms of a same predetermined amplitude. The regions RC1 and RC2 have waveforms of a same predetermined amplitude. The amplitudes of the waveforms of the regions RC1 and RC2 are larger than the amplitudes of the waveforms of the regions RA1 and RA2. An amplitude of the waveform of the region RB is larger than the amplitude of the waveform of the regions RC1 and RC2. An amplitude of a waveform of the region RD is larger than the amplitude of the waveform of the region RB.

That is, the first region R1 includes a plurality of regions RA1, RA2, RB, RC1, RC2, and RD having different waveform amplitudes. The amplitude of the waveform included in the second region R2 is larger than the amplitude of any of the waveforms of the regions RA1, RA2, RB, RC1, RC2, and RD.

RA1, RB, RA2, RC1, RD, and RC2 sequentially appear in the first region R1. The second region R2 appears after the first region R1. The waveforms in the one period T repeatedly appear on the time axis. That is, the first region R1 and the second region R2 having a larger amplitude than the first region R1 alternatively appear on the time axis.

In the one period T, the second region R2 having a time axis width smaller than a time axis width of the first region R1 appears after the first region R1. Thereby, an operator can feel the vibration based on the drive current waveform in the second region R2 as an accent.

Figure 8B:
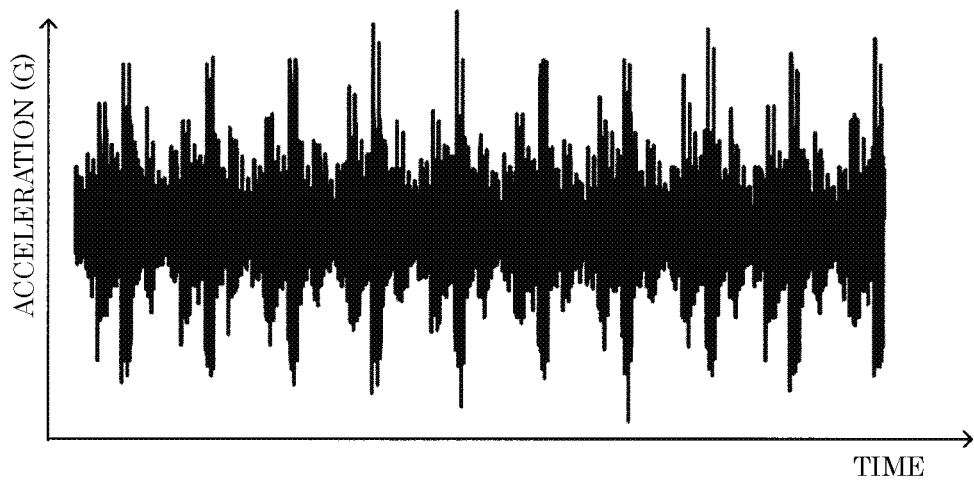
FIG. 8B is a view illustrating a vibration waveform corresponding to the drive current waveform according to the fifth example.

An example of the vibration waveform of the vibration motor 121A based on the drive current waveform is illustrated in FIG. 8B. The cap unit 12 and the pen unit 11 vibrate due to the vibration of the vibration motor 121A, and thereby, an operator who performs a writing operation using the pen unit 11 can obtain a sense close to a sense of weakly catching in an operation of actually writing a letter or the like with a pencil.

In addition, in this embodiment, the waveforms of different frequencies are also adjacent to each other on the time axis in the regions RA1, RA2, RB, RC1, RC2, and RD and each of the second region R2, in the same manner as in the above-described examples. For example, a waveform of a single frequency may be included in the second region R2. Thereby, it is possible to obtain a natural change in tactile sense in the actual writing operation with a pencil.

Next, an operation sense according to a sixth example realized by the handwriting input system 4 will be described. The operation sense according to the sixth embodiment is a sense like turning a jog dial.

Figure 9A:
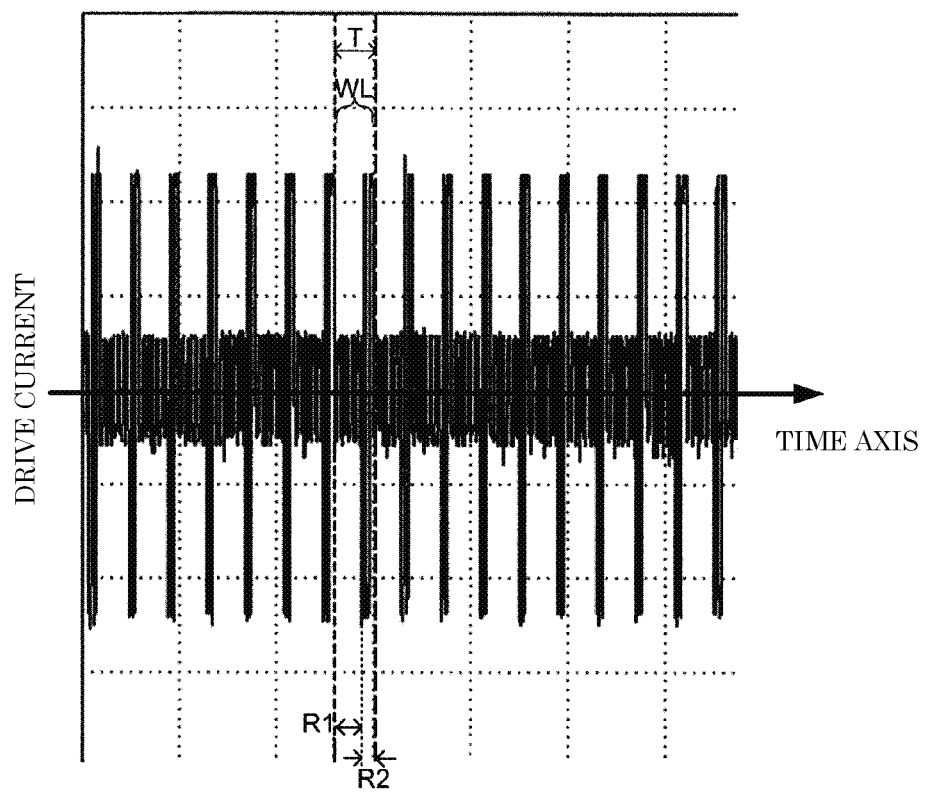
FIG. 9A is a view illustrating a drive current waveform according to a sixth example.

In the present embodiment, an operator brings the touch pen 11 into contact with the touch panel 21 so as to turn a dial displayed on the display unit 22. Thereby, the touch panel controller 23 controls the display unit 22 so as to display an image of the dial turned according to the detected position based on the detection result received from the touch panel 21. At this time, the controller 23 transmits a control signal to the controller 121B, and the controller 121B controls the drive current waveform of the vibration motor 121A. The drive current waveform at this time is illustrated in FIG. 9A.

The drive current waveform illustrated in FIG. 9A varies above and below the time axis in the same manner as in FIG. 2A. The drive current waveform illustrated in FIG. 9A includes the first region R1 and the second region R2 in one period T. Ab amplitude of the waveform included in the second region R2 is larger than an amplitude of the waveform included in the first region R1. The amplitude of the waveform of the first region R1 is single.

The second region appears after the first region R1 in the one period T. The waveforms in the one period T repeatedly appear on the time axis. That is, the first region R1 and the second region R2 having a larger amplitude than the first region R1 alternatively appear on the time axis.

In the one period T, the second region R2 having a time axis width smaller than a time axis width of the first region R1 appears after the first region R1. Thereby, an operator can feel the vibration based on the drive current waveform in the second region R2 as an accent.

In addition, a frequency of the waveform included in the second region R2 is a resonance frequency of the vibration motor 121A.

Figure 9B:
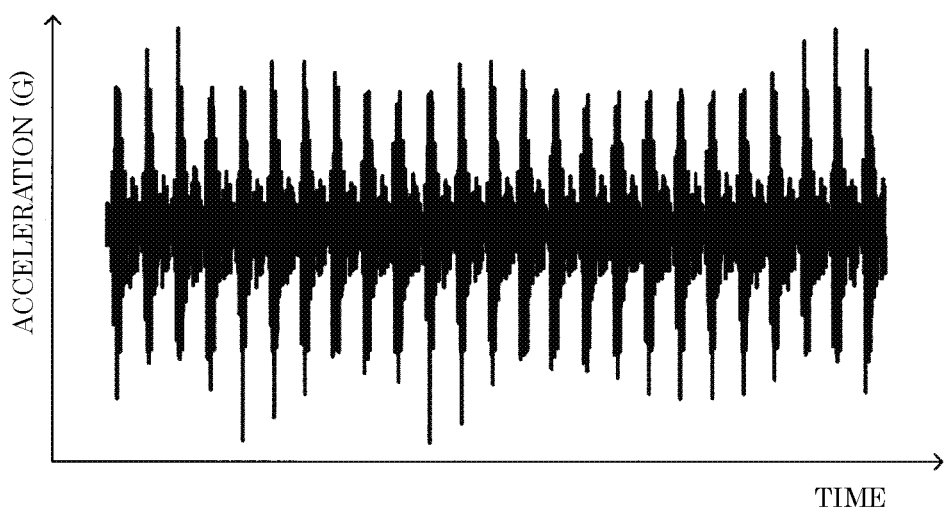
FIG. 9B is a view illustrating a vibration waveform corresponding to the drive current waveform according to the sixth example.

An example of the vibration waveform of the vibration motor 121A based on the drive current waveform is illustrated in FIG. 9B. As the cap unit 12 and the pen unit 11 vibrate according to the vibration of the vibration motor 121A, an operator who performs an operation of turning the dial using the pen unit 11 can obtain a sense close to the operation of actually turning the dial via a tactile sense.

In addition, in the present example, waveforms of different frequencies are also adjacent to each other on the time axis in at least the first region R1 of the first region R1 and the second region R2 in the same manner as in the above-described examples. Thereby, it is possible to obtain a natural change in tactile sense in the operation of turning an actual dial.

A test was performed how an operator could recognize about operation senses of five patterns of the first example (sense of writing onto smooth paper), the second example (sense of writing onto rough paper), the fourth example (sense of erasing with an eraser), the fifth example (sense of writing with a pencil), and the sixth example (sense of turning a dial), among the operational senses described above.

In the test described above, an examinee was made to feel five patterns of vibration in a state where there was no visual information and auditory information making the senses of each pattern to be imaged, while the examinee performed an operation using a touch pen, after the examinee was heard about intended senses in advance. The test results are illustrated in FIG. 10.

In the results illustrated in FIG. 10, the number of persons who felt the intended sense for each pattern among the six examinees, and the number of persons who did not feel the intended senses are illustrated, and a ratio of the number of persons who felt the intended sense among the six examinees is illustrated as a recognition rate. As illustrated in FIG. 10, the recognition rate in all the patterns is greater than or equal to 67%, and it is confirmed that presentation of the sense to an operator made by generating the vibration using the above-described drive current waveform is effective.

The following modification examples may be implemented for the first to sixth examples described above. Here, the controller 23 can detect a movement speed of a contact position, based on the result of detecting the position where the pen unit 11 touches the touch panel 21 using the touch panel 21. That is, for example, a writing speed can be detected in a case of a writing operation of the touch pen 1, an erasing operation speed can be detected in a case of an operation of erasing a letter or the like using the touch pen 1, and dial turning speed can be detected in a case of an operation of turning the dial using the touch pen 1.

Therefore, the controller 23 transmits a control signal to the controller 121B such that one period T of the drive current waveform described in the first example to the sixth example is shorter as the speed of the detected contact position is higher. In this case, the number of small unit waves may be changed without changing the frequencies of each small unit wave included in the drive current waveform of the one period T, or the frequency of the small unit wave may be changed without changing the number of small unit waves. Thereby, it is possible to obtain a sense closer to an actual operation regardless of the operation speed of the touch pen 1.

As described above, the vibration system 121 according to the present embodiment includes the linear vibration motor 121A, and the controller 121B that controls the drive current waveform of the vibration motor 121A. The drive current waveform has a configuration in which the large unit waves WL having the same waveform are consecutively arranged side by side on the time axis. The large unit wave includes the first regions R1, R11, and R12 having waveforms with small amplitudes in one period T which is a width of the time axis of the large unit wave, and the second regions R2, R21, and R22 having waveforms with larger amplitudes larger than the amplitude of the first region, wherein the first region and the second region alternatively appear on the time axis.

According to the configuration, it is possible to obtain a sense closer to an actual operation via a tactile sense according to a vibration by adjusting amplitude values (a ratio between the amplitude value in the first region and the amplitude value in the second region) of waveforms in the first region and the second region, a time axis width of the first region and the second region, frequencies of the waveforms in the first region and the second region, and the like.

In addition, the time axis widths of the second regions R2, R21, and R22 are smaller than the time axis widths of the first regions R1, R11, and R12. Thereby, an operator can feel the vibration according to the waveform of the second region having a large amplitude as an accent, and this contributes to realization of the sense closer to the actual operation.

In addition, at least one of the first regions R1, R11, and R12 and the second regions R2, R21, and R22 has waveforms that are different in frequency and are adjacent on the time axis. Thereby, it is possible to obtain a natural change in tactile sense in an actual operation.

In addition, in one period T of the large unit wave of the drive current waveform, the first region R11 having a first time axis width, the second region R21, the first region R12 having a second time axis width smaller than the first time axis width, and the second region R22 sequentially appear on the time axis (first example). Thereby, it is possible to obtain a sense close to a writing operation on, for example, smooth paper.

In addition, the first region R1 includes the plurality of regions RA, RB, and the like having different waveform amplitudes (second to fifth examples). Thereby, it is possible to realize lots of variations of the operation sense that can obtain a sense closer to the actual operation, by adjusting the number of the plurality of regions, the width of each of the plurality of regions on the time axis, the amplitude values in the plurality of regions, and the like.

In addition, the first region R1 includes the plurality of regions RA, RB, and the like whose waveform amplitudes increase by a waveform amplitude of a rear region on the time axis (second and third examples). Thereby, it is possible to realize a specific operation that can obtain a sense close to the actual operation.

In addition, the second region R2 has a waveform in which a frequency becomes a resonance frequency of a vibration motor (sixth example). Thereby, for example, it is possible to obtain a sense close to an operation of actually turning a dial.

In addition, the handwriting input system 4 according to the present embodiment is an operation device including the vibration system 121 having the above-described configuration. According to the operation device, it is possible to obtain a sense closer to an actual operation.

in addition, in the above-described operation device, the controller 121B shortens the one period T of the large unit wave as a movement speed of a contact position by an operation tool (the touch pen 1) is higher. Thereby, it is possible to obtain a sense closer to an actual operation, regardless of the speed of an operation performed by the operation tool.

The touch pen 1 according to the present embodiment includes at least the vibration motor 121A of the vibration system 121 having the above-described configuration. An operator who performs an operation (for example, a writing operation or the like) using the touch pen can obtain a sense close to an actual operation by vibrating the touch pen.

In addition, in the above-described touch pen 1, the controller 121B shortens the one period T of the large unit wave as a movement speed of a contact position made by the touch pen is higher. Thereby, it is possible to obtain a sense closer to an actual operation regardless of the speed of an operation made by the touch pen.

In addition, the cap unit 12 according to the present embodiment is detachable from the pen unit 11 and includes at least the vibration motor 121A of the vibration system 121 having the above-described configuration. If the cap unit is attached to and detached from the pen unit, the touch pen is configured, and as the cap unit vibrates, it is possible to obtain a sense closer to an actual operation in an operation in which the touch pen is used. Furthermore, since the cap unit is detachable, it is possible to select whether or not to give vibration to the pen unit.

In addition, in the above-described cap unit 12, the controller 121B shortens the one period T of the large unit wave as a movement speed of a contact position made by the pen unit 11 is higher. Thereby, it is possible to obtain a sense closer to an actual operation regardless of the speed of an operation performed by the pen unit.

Figure 11:
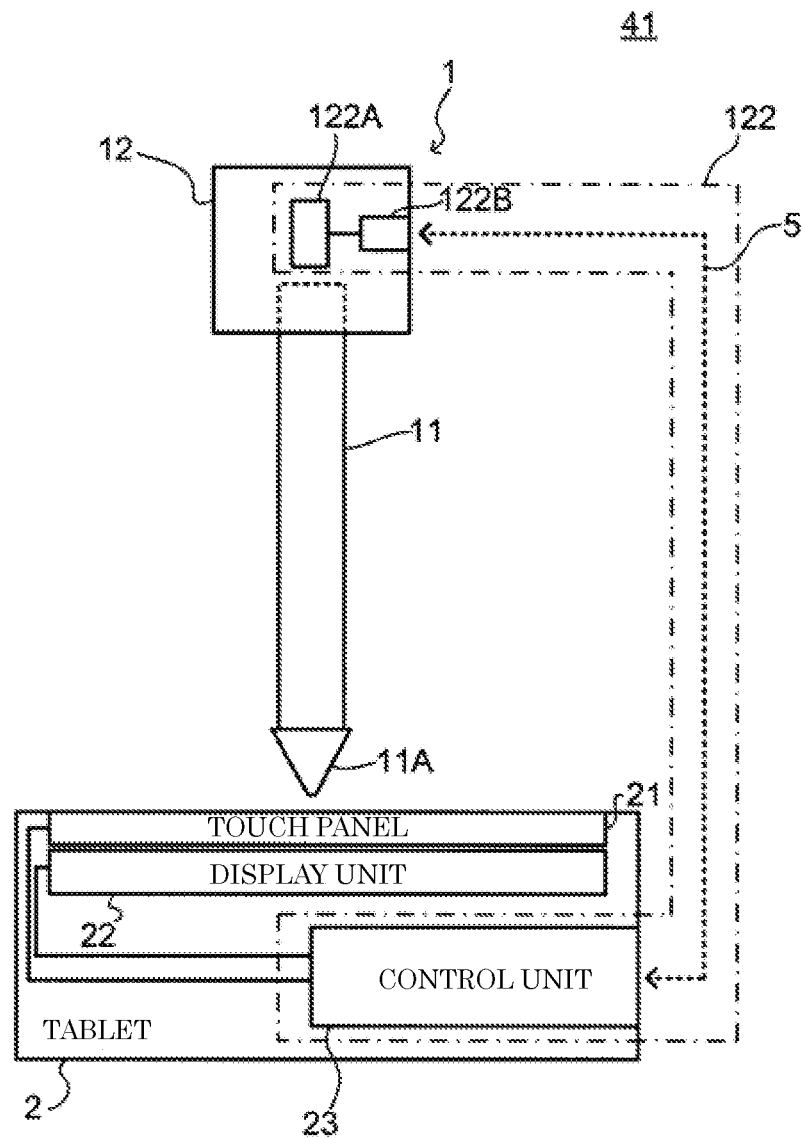
FIG. 11 is a block diagram illustrating a schematic configuration of a handwriting input system according to a second exemplary embodiment of the present invention.

Next, a second embodiment of the present invention will be described. FIG. 11 is a block diagram illustrating a schematic configuration of a handwriting input system 41 according to a second embodiment. In the present embodiment, the cap unit 12 includes a vibration motor 122A and a driver 122B. A controller 23 provided in a tablet 2 is connected to the driver 122B by radio 5. A vibration system 122 according to the present embodiment includes the vibration motor 122A, the driver 122B, and the controller 23. That is, the vibration system 122 according to the present embodiment includes a configuration of a touch pen 1 side and a configuration of the tablet 2 side.

The controller 23 transmits a control signal to the driver 122B via the radio 5, and the driver 122B supplies a drive current to the vibration motor 122A, based on the control signal to be transmitted. That is, the controller 23 controls a drive current waveform of the vibration motor 122A. A specific drive current waveform is the same as the drive current waveform in the first embodiment described above, and thus, description thereof will be omitted herein.

Accordingly, the vibration system 122 according to the present embodiment includes the linear vibration motor 122A and the controller 23 that controls the drive current waveform of the vibration motor 122A. The drive current waveform includes first regions R1, R11, and R12 having waveforms with small amplitudes, second regions R2, R21, and R22 having waveforms with larger amplitudes than the first region, and the first regions and the second regions alternatively appear on the time axis.

According to the configuration, it is possible to obtain a sense closer to an actual operation via a tactile sense according to vibration, in the same manner as in the first embodiment. Particularly, in the present embodiment, since the cap unit 12 and the tablet 2 are connected by the radio 5, it is possible to increase operability in which the touch pen 1 is used.

Figure 12:
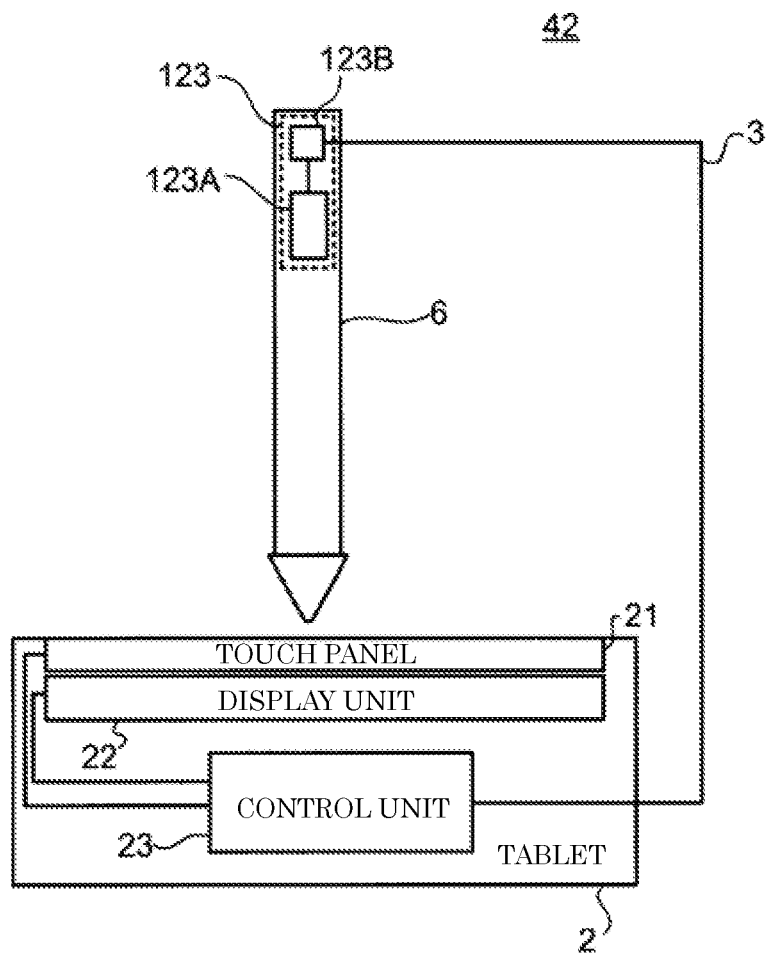
FIG. 12 is a block diagram illustrating a schematic configuration of a handwriting input system according to a third exemplary embodiment of the present invention.

Next, a third embodiment of the present invention will be described. FIG. 12 is a block diagram illustrating a schematic configuration of a handwriting input system 42 according to a third embodiment. In the present embodiment, a cap unit is not provided on the touch pen 6, and a vibration system 123 is provided in a unit corresponding to the pen unit in the first embodiment. The vibration system 123 includes a vibration motor 123A and a controller 123B. A controller 23 of a tablet 2 is connected to the controller 123B by a wire 3.

The controller 23 transmits a control signal to the controller 123B via the wire 3, and the controller 123B supplies a drive current to the vibration motor 123A, based on the control signal to be transmitted. That is, the controller 123B controls a drive current waveform of the vibration motor 123A. A specific drive current waveform is the same as the drive current waveform in the first embodiment described above, and thus, description thereof will be omitted herein. A target which is vibrated by the vibration motor 123A is the touch pen 6.

Accordingly, the vibration system 123 according to the present embodiment includes a linear vibration motor 123A and a controller 123B that controls a drive current waveform of the vibration motor 123A. The drive current waveform includes first regions R1, R11, and R12 having waveforms with small amplitudes, second regions R2, R21, and R22 having waveforms with larger amplitudes than the amplitude in the first region, and the first regions and the second regions alternatively appear on the time axis.

According to the configuration, it is possible to obtain a sense closer to an actual operation via a tactile sense according to vibration in the same manner as in the first embodiment.

Figure 13:
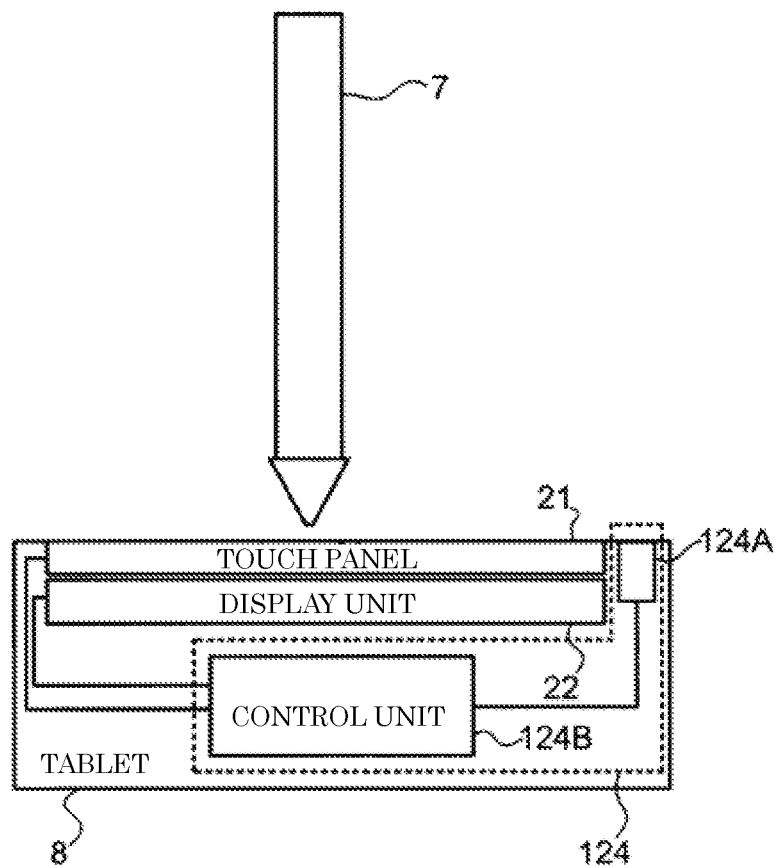
FIG. 13 is a block diagram illustrating a schematic configuration of a handwriting input system according to a fourth exemplary embodiment of the present invention.

Next, a fourth embodiment of the present invention will be described. FIG. 13 is a block diagram illustrating a schematic configuration of a handwriting input system 43 according to a fourth embodiment. The handwriting input system 43 according to the present embodiment includes a touch pen 7 and a tablet 8. A vibration motor is not provided on the touch pen 7. The tablet 8 includes a vibration system 124. The vibration system 124 includes a vibration motor 124A and a controller 124B. The controller 124B controls a drive current waveform of the vibration motor 124A. A target which is vibrated by the vibration motor 124A is the touch panel 21. A specific drive current waveform is the same as the drive current waveform in the first embodiment described above, and thus, description thereof will be omitted herein.

With the configuration, if the touch pen 7 operates in contact with the touch panel 21, the touch panel 21 vibrates according to drive of the vibration motor 124A, based on the drive current waveform. Vibration of the touch panel 21 is transmitted to an operator as a tactile sense via the touch pen 7. Thereby, the operator can obtain a sense closer to an actual operation (handwriting or the like).

That is, the vibration system 124 according to the present embodiment includes the linear vibration motor 124A and the controller 124B that controls the drive current waveform of the vibration motor 124A. The drive current waveform includes first regions R1, R11, and R12 having waveforms with small amplitudes, second regions R2, R21, and R22 having waveforms with larger amplitudes than the amplitude in the first region, and the first regions and the second regions alternatively appear on the time axis.

In addition, the tablet 8 according to the present embodiment includes the touch panel 21 and the vibration system 124, and a vibration target causing the vibration to be generated by the vibration motor 124A of the vibration system 124 is the touch operation device which is the touch panel 21.

Figure 14:
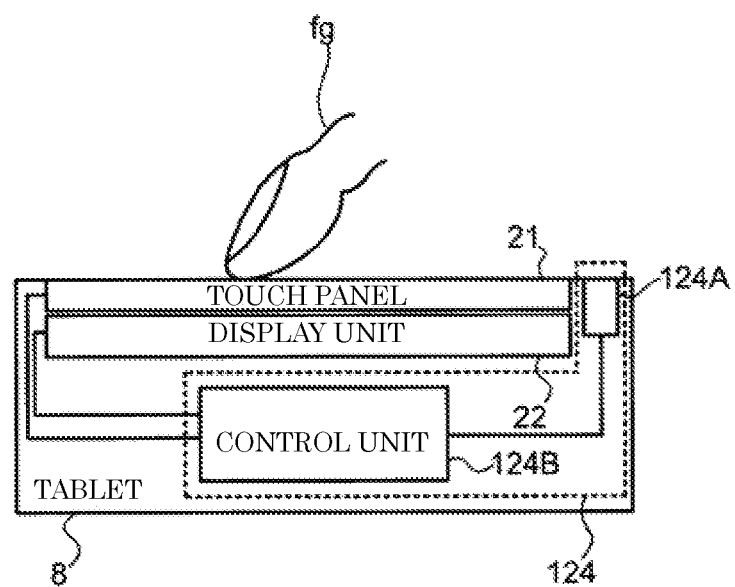
FIG. 14 is a block diagram illustrating a schematic configuration of a tablet according to a fifth exemplary embodiment of the present invention.

Next, a fifth embodiment of the present invention will be described. FIG. 14 is a block diagram illustrating a schematic configuration of a tablet 8 according to a fifth embodiment. In the present embodiment, the tablet 8 has the same configuration as the tablet 8 according to the fourth embodiment described above, but a finger fg of an operator is used instead of the touch pen as an operation tool.

When the operator brings the finger fg into contact with the touch panel 21, the vibration motor 124A is driven by the control of the drive current waveform made by the controller 124B, and the touch panel 21 vibrates. Vibration of the touch panel 21 is transmitted to the finger fg. Thereby, the operator can obtain a sense closer to an actual operation via a tactile sense of the finger fg.

In addition, in the same manner as in the modification example in the first embodiment, as the speed of the contact position on the touch panel 21 set by the finger fg (operation tool) is higher, one period T of the drive current waveform may be controlled to be shorter. Thereby, it is possible to obtain a sense closer to an actual operation, regardless of the operation speed of the finger fg.

That is, in the touch operation device 8, the controller 124B shortens the one period T of the large unit wave as the movement speed of a contact position set by the operation tool fg becomes higher.

As such, although embodiments of the present invention are described above, various modifications can be made to the embodiments as long as the modifications are within the scope of the gist of the present invention.

For example, in a case where a vibration motor is provided on the touch pen, a target to be brought into contact with the touch pen may be a target object (a glass plate, a desk, or the like) other than a touch panel.

The present invention can be used for, for example, a system which uses a touch pen or the like.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration system comprising:
a linear vibration motor; and
a controller that controls a drive current waveform of the vibration motor; wherein
the drive current waveform includes consecutively arranged large unit waves having same waveforms side by side on a time axis;
the large unit wave includes a first region having a waveform with a smaller amplitude in one period, which is a width of the large unit wave on the time axis, and a second region having a waveform with a larger amplitude than the amplitude in the first region;
the first region and the second region alternatively appear on the time axis;
a time axis width of the second region is smaller than a time axis width of the first region; and
vibrations of the linear vibration motor corresponding to the drive current waveform in the second region provide an ascending tactile feeling to a user of the vibration system.

2. The vibration system according to claim 1, wherein at least one of the first region and the second region includes waveforms that are different in frequency and are adjacent on the time axis.

3. The vibration system according to claim 1, wherein, in one period of the large unit wave of the drive current waveform, the first region of a first time axis width, the second region, the first region of a second time axis width smaller than the first time axis width, and the second region, sequentially appear on the time axis.

4. The vibration system according to claim 1, wherein the first region includes a plurality of regions with different waveform amplitudes.

5. The vibration system according to claim 4, wherein the first region includes the plurality of regions in which a waveform amplitude increases as the region appears rearward on the time axis.

6. The vibration system according to claim 1, wherein the second region has a waveform with a frequency that is a resonance frequency of the vibration motor.

7. An operation device comprising:
the vibration system according to claim 1.

8. The operation device according to claim 7, wherein the controller shortens one period of the large unit wave as a movement speed of a contact position by an operation tool increases.

9. A touch pen comprising:
the vibration motor of the vibration system according to claim 1.

10. The touch pen according to claim 9, wherein the controller shortens one period of the large unit wave as a movement speed of a contact position by the touch pen increases.

11. A cap unit which is attachable to and detachable from a pen unit, comprising:
the vibration motor of the vibration system according to claim 1.

12. The cap unit according to claim 11, wherein the controller shortens one period of the large unit wave as a movement speed of a contact position by the pen unit increases.

13. A touch operation device comprising:
a touch panel; and
the vibration system according to claim 1; wherein
a vibration target of a vibration motor of the vibration system is the touch panel.

14. The touch operation device according to claim 13, wherein the controller shortens one period of the large unit wave as a movement speed of a contact position by an operation tool increases.

* * * * *